(12) United States Patent
Kitagawa (10) Patent No.: US 10,948,018 B2
(45) Date of Patent: Mar. 16, 2021

(54) BEARING DEVICE FOR WHEEL (71) Applicant: JTEKT CORPORATION, Osaka (JP)

(72) Inventor: Akira Kitagawa, Yao (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/627,233

(22) PCT Filed: Jun. 20, 2018

(86) PCT No.: PCT/JP2018/023391
§ 371 (c)(1),
(2) Date: Dec. 27, 2019

(87) PCT Pub. No.: WO2019/004017
PCT Pub. Date: Jan. 3, 2019

(65) Prior Publication Data
US 2020/0224716 A1 Jul. 16, 2020

(30) Foreign Application Priority Data

Jun. 28, 2017 (JP) .............................. JP2017-126025

(51) Int. Cl.
*F16C 33/78* (2006.01)
*F16C 19/18* (2006.01)
(Continued)

(52) U.S. Cl.
CPC ...... *F16C 33/7886* (2013.01); *B60B 27/0073* (2013.01); *F16C 33/7823* (2013.01);
(Continued)

(58) Field of Classification Search
CPC ................ F16C 19/186; F16C 33/7823; F16C 33/7879; F16C 33/7883; F16C 33/7886;
(Continued)

(56) References Cited

U.S. PATENT DOCUMENTS 9,855,793 B2 * 1/2018 Lim ...................... F16J 15/3264
10,208,802 B2 * 2/2019 Kato ....................... F16C 19/06
(Continued)

FOREIGN PATENT DOCUMENTS

JP          2012082912 A  *  4/2012  ............ F16C 33/805
JP          2015-064044 A      4/2015
(Continued)

OTHER PUBLICATIONS

Sep. 18, 2018 International Search Report issued in International Patent Application No. PCT/JP2018/023391.
(Continued)

*Primary Examiner* — Alan B Waits
(74) *Attorney, Agent, or Firm* — Oliff PLC (57) ABSTRACT

A bearing device for a wheel includes: an outer ring including a leg portion protruding radially on an outer periphery; an inner shaft provided on a shaft end; rolling elements; a sealing device which seals an opening portion on the flange side; and a slinger fixed to the inner shaft and extending axially at a radial outer side of the sealing device. The sealing device includes an elastic lip and a cylindrical cover portion in elastic contact with an outer peripheral surface of the outer ring. The slinger is opposed to at least a part of an outer periphery of the cover portion in a radial direction via a clearance.

3 Claims, 6 Drawing Sheets

(51) Int. Cl.
 *F16C 33/80* (2006.01)
 *B60B 27/00* (2006.01)
(52) U.S. Cl.
 CPC .......... *F16C 19/186* (2013.01); *F16C 33/805* (2013.01); *F16C 2326/02* (2013.01)
(58) Field of Classification Search
 CPC .... F16C 33/80; F16C 33/805; F16C 2326/02; F16C 2223/42; B60B 27/0073
 See application file for complete search history.

(56) References Cited

U.S. PATENT DOCUMENTS

| | | | | |
|---|---|---|---|---|
| 2010/0021097 A1* | 1/2010 | Uchida | ............ | F16C 13/06 |
| | | | | 384/492 |
| 2015/0110432 A1* | 4/2015 | Wakisaka | ............. | F16C 33/805 |
| | | | | 384/486 |
| 2016/0221391 A1* | 8/2016 | Lim | ................... | F16C 33/805 |
| 2017/0284470 A1* | 10/2017 | Wollert | ................ | F16C 33/805 |
| 2018/0172077 A1* | 6/2018 | Kato | .................... | F16C 33/805 |

FOREIGN PATENT DOCUMENTS

| | | | | |
|---|---|---|---|---|
| JP | 2017-036740 A | | 2/2017 | |
| JP | 2017207124 A | * | 11/2017 | ............ F16C 33/782 |
| KR | 2014-0005546 A | | 1/2014 | |
| WO | 2016/199881 A1 | | 12/2016 | |

OTHER PUBLICATIONS

Sep. 18, 2018 Written Opinion of the International Searching Authority issued in International Patent Application No. PCT/JP2018/023391.

* cited by examiner

BEARING DEVICE FOR WHEEL

TECHNICAL FIELD

Aspects of the present invention relate to a bearing device for a wheel, and more particularly to improvement of a sealing device.

BACKGROUND ART

Figure 6:
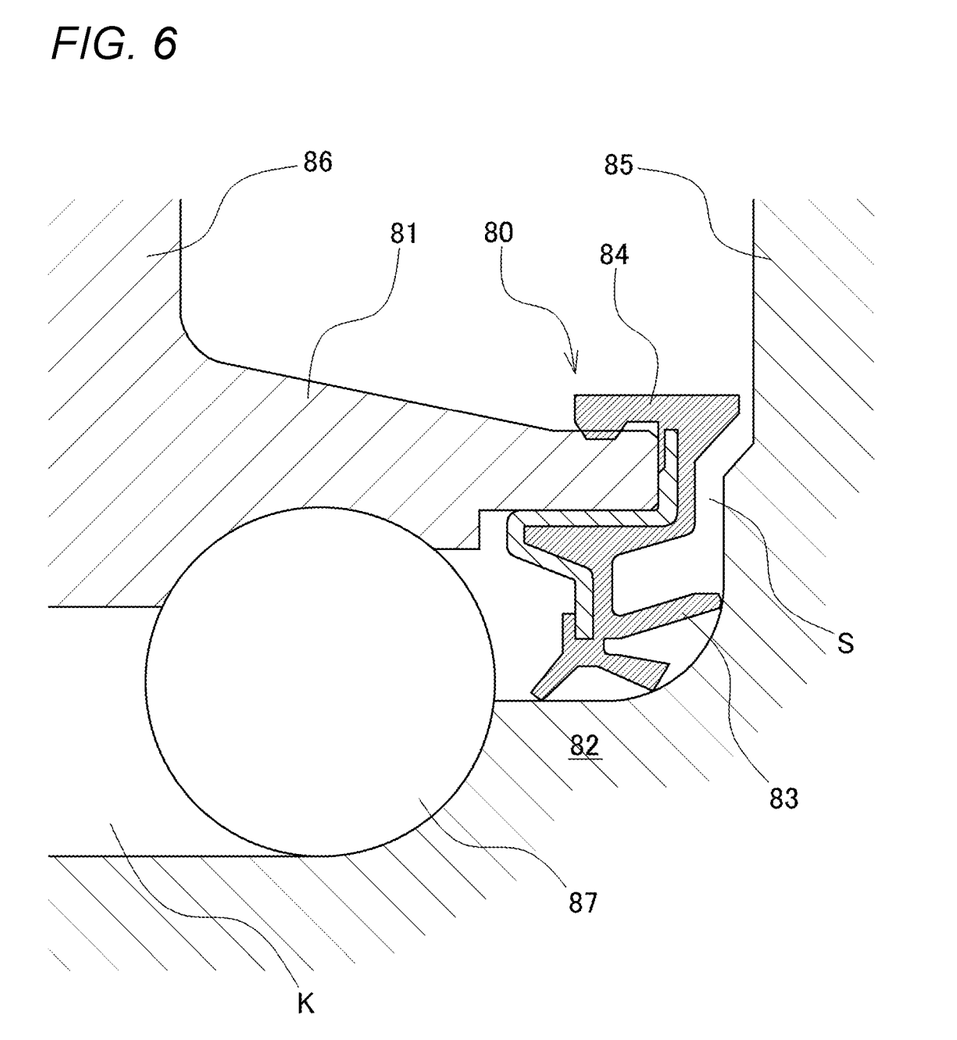
FIG. 6 is an axial sectional view of a related art sealing device installed on a flange side.

In order to rotationally support a wheel of a vehicle, a unit-type bearing device in which a rolling bearing, a wheel mounting flange, and the like are integrated is used. For example, as illustrated in FIG. 6, a bearing device of Patent Document 1 includes an outer ring 81 fixed to a suspension device such as a knuckle and an inner shaft 82 which is rotatable inside the outer ring 81. A leg portion 86 for fixing the bearing device to the knuckle is provided on the outer periphery of the outer ring 81 and a flange 85 for fixing the wheel is provided at the shaft end of the inner shaft 82.

A plurality of balls 87 are incorporated between the outer ring 81 and the inner shaft 82. Grease is sealed in an annular space K formed between the inner periphery of the outer ring 81 and the outer periphery of the inner shaft 82 and the raceway surface on which the ball 87 rolls is lubricated. Sealing devices are respectively incorporated in opening portions on both sides in an axial direction of the annular space K to prevent foreign matters such as muddy water from entering the annular space K.

The bearing device is used in a position close to the road surface and exposed to the external space. Therefore, when the vehicle travels in rainy weather, it directly receives muddy water on the road surface. For this reason, a sealing device used for a bearing device for a wheel requires a good sealing property.

FIG. 6 illustrates the sealing device 80 installed in the opening portion on the flange 85 side of the annular space K, which is similar to the sealing device described in Patent Document 1. The sealing device 80 is fixed to the outer ring 81 and a rubber lip 83 which is in sliding contact with the inner shaft 82 and a cylindrical cover portion 84 (outer lip) are integrally formed. The cover portion 84 is fitted to the outer periphery of the outer ring 81 with a margin. Therefore, the applied muddy water is prevented from flowing along the outer periphery of the outer ring 81 and into the clearance S with respect to the flange 85. As a result, the wear of the lip 83 can be prevented.

Thus, in the bearing device for a wheel, various measures are taken to prevent the intrusion of muddy water. However, as described above, since the bearing device is used in a state exposed to the external space, rust may be generated on the outer peripheral surface by the applied muddy water. In particular, when calcium chloride is sprayed to prevent freezing of the road surface, rusting occurs further.

When rust is generated on the outer peripheral surface of the bearing device in this way, the rust may enter the sliding contact portion of the lip 83 and the sealing property may be reduced. The appearance of the vehicle is significantly deteriorated due to rusting. For this reason, in the bearing device for a wheel, there is a growing need to coat the entire exposed portion to prevent the occurrence of rust.

RELATED ART DOCUMENT(S)

Patent Document(S)

Patent Document 1: JP-A-2015-64044

SUMMARY OF THE INVENTION

Problem to be Solved by the Invention

The bearing device for a wheel is manufactured in a mass production facility. Therefore, the coating work is performed by spraying coarting directly onto the bearing device that has been assembled using a robot or the like. In this case, when the coating adheres to the rubber member such as the lip 83, the elasticity of the rubber is lowered by the solidified coating, and thus the sealing property may be reduced. The rubber material may be deteriorated by contact with the coating. When the coating stays in the clearance S, the outer ring 81 and the inner shaft 82 are fixed by the solidified coating, and causes a problem that the running torque of the inner shaft 82 becomes heavy. For this reason, when coating, it is necessary to perform masking to prevent the coating from adhering to a rubber member such as the lip 83.

However, in particular, since the sealing device 80 installed on the flange 85 side is incorporated in a portion interposed between the flange 85 and the leg portion 86 of the outer ring 81 in the axial direction, it cannot be easily masked. In an automated mass production facility, the masking device has a complicated structure, which increases the manufacturing cost of the bearing device.

An object of the aspect of the invention is to provide a bearing device for a wheel which eliminates the need for masking a sealing device or makes it possible to mask the sealing device in an extremely simple manner when coating an outer peripheral surface of the bearing device for a wheel, especially an outer peripheral surface of a region interposed between a leg portion of an outer ring and a flange in an axial direction, in such a manner that an increase in manufacturing cost is prevented.

Means for Solving the Problem

According to an aspect of the invention, there is provided a bearing device for a wheel which includes an outer ring including an outer raceway surface formed on an inner periphery and a leg portion protruding radially on an outer periphery and fixed to a vehicle body, an inner shaft including an inner raceway surface formed on an outer periphery and a flange provided on a shaft end to which a wheel is attached, a plurality of rolling elements rotatably provided between the outer raceway surface and the inner raceway surface, a sealing device which seals an opening portion on the flange side of an annular space formed between the outer ring and the inner shaft, and a slinger fixed to the inner shaft and extending axially at an radial outer side of the sealing device, in which the sealing device includes an elastic lip fixed to the outer ring and in sliding contact with the inner shaft and a cylindrical cover portion in elastic contact with an outer peripheral surface of the outer ring and the slinger is opposed to at least a part of an outer periphery of the cover portion in a radial direction via a clearance.

Advantages of the Invention

According to the aspect of the invention, when coating the outer peripheral surface of the bearing device for a wheel, particularly the outer peripheral surface of the region interposed in the axial direction between the fixed portion and the flange, an operation such as masking the sealing device is not necessary or masking can be performed in an extremely simple manner. Therefore, an increase in the manufacturing cost of the bearing device for a wheel can be prevented.

MODE FOR CARRYING OUT THE INVENTION

Figure 1:
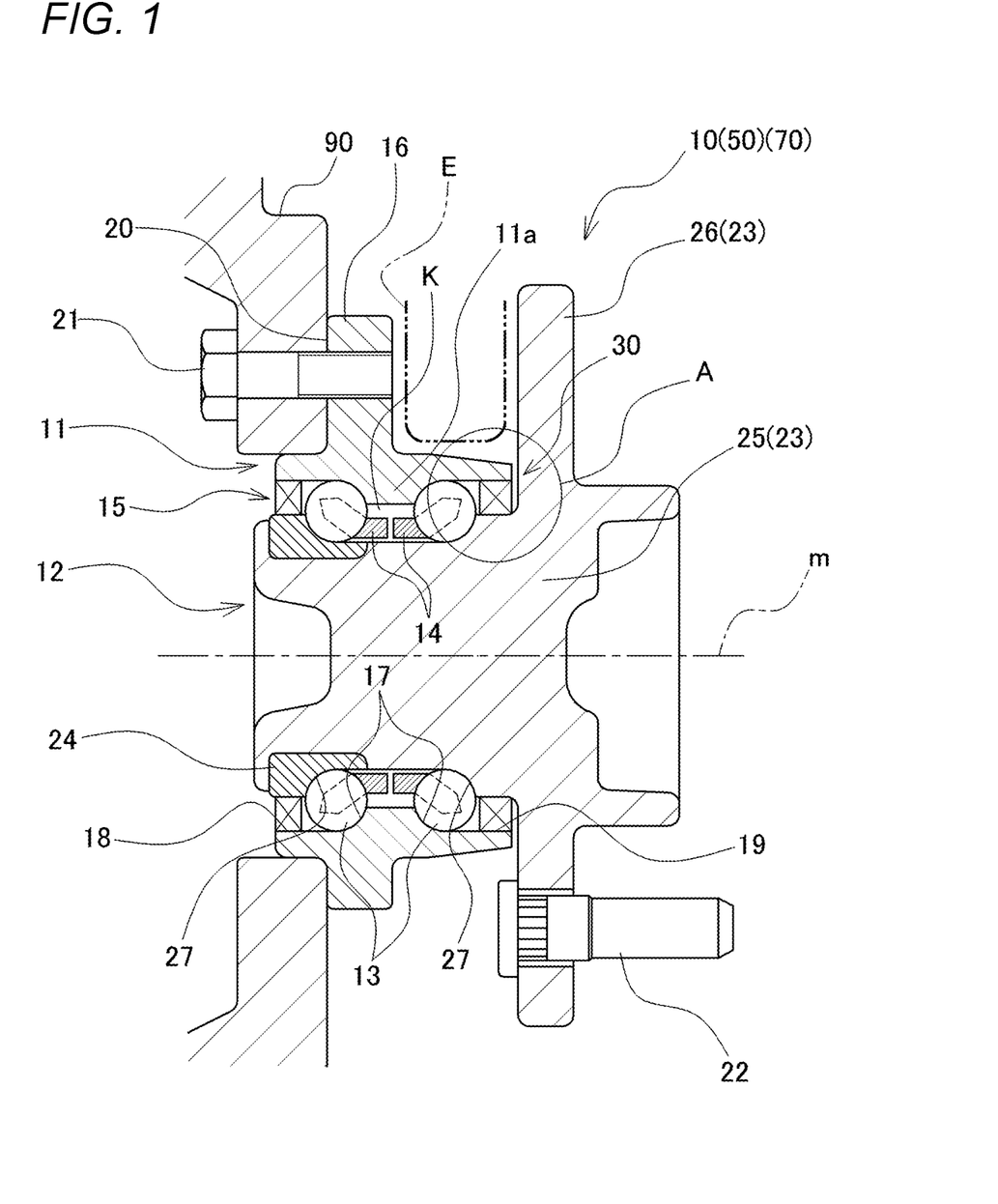
FIG. 1 is an axial sectional view of a bearing device for a wheel according to a first embodiment of the invention.

Embodiments of the invention will be described with reference to the drawings. FIG. 1 is an axial sectional view of a bearing device for a wheel 10 (hereinafter simply referred to as "bearing device") according to a first embodiment (hereinafter referred to as "first embodiment") of the invention when it is assembled to a knuckle 90 which is a suspension device of a vehicle. In FIG. 1, a sealing device is illustrated in a simplified manner. In the following description, a direction of a rotation axis m of the bearing device 10 is referred to as an axial direction, a direction orthogonal to the rotation axis m is referred to as a radial direction, and a direction of circling around the rotation axis m is referred to as a circumferential direction. In FIG. 1, the right side of the drawing is the outside of the vehicle and the left side is the inside of the vehicle. Therefore, in the following description, the right side of the drawing is referred to as "outer side" and the left side is referred to as "inner side".

The bearing device 10 includes an outer ring 11, an inner shaft 12, a plurality of balls 13 as rolling elements, a retainer 14, a first sealing device 15, and a second sealing device 30.

The outer ring 11 is manufactured by hot forged carbon steel and an outer ring main body 11a of a substantially cylindrical shape and a plurality of leg portions 16 are integrally formed.

A double row outer raceway surface 17 is formed on the inner periphery of the outer ring 11. A sealing device mounting surface 18 is formed on the inner side of the outer raceway surface 17 and a sealing device mounting surface 19 is formed on the outer side of the outer raceway surface 17.

The leg portion 16 is formed in a direction protruding in the radial direction from the outer periphery of the outer ring main body 11a. A turning process is performed on the inner side of each leg portion 16 and a mounting surface 20 orthogonal to the rotation axis m is formed. Each leg portion 16 is formed with a screw hole penetrating in the axial direction and the bearing device 10 is fixed to the knuckle 90 by screwing a bolt 21 into the screw hole.

The inner shaft 12 includes a hub shaft 23 and an inner ring 24.

In the hub shaft 23, a screw shank 25 and a flange 26 are integrally formed by hot forged carbon steel. One inner raceway surface 27 is formed on the outer periphery of the screw shank 25. The flange 26 has a disc shape and is formed on a shaft end portion on the outer side of the screw shank 25 in a direction orthogonal to the rotation axis m. A plurality of hub bolts 22 are assembled to the flange 26 to protrude outward in the axial direction and a wheel (not illustrated) is attached from the right side of the drawing.

The inner ring 24 is made of bearing steel and the other inner raceway surface 27 is formed on the outer periphery thereof. The inner ring 24 is fixed integrally with the hub shaft 23 by being fitted into the shaft end portion on the inner side of the screw shank 25 coaxially and then plastically deforming the shaft end portion.

An annular member 44 (see FIG. 2) is attached to a corner portion where the screw shank 25 of the inner shaft 12 and the flange 26 are connected and a part of the annular member 44 forms a slinger 40. The details of the slinger 40 will be described below together with the form of the second sealing device 30.

The balls 13 are rotatably incorporated between the outer raceway surfaces 17 and the inner raceway surfaces 27 and are held by the retainers 14 at substantially equal intervals in the circumferential direction. Thus, the inner shaft 12 is rotatably supported with respect to the outer ring 11. Grease is enclosed in an annular space K formed between the inner periphery of the outer ring 11 and the outer periphery of the screw shank 25 and the contact portions between the balls 13 and the raceway surfaces 17 and 27 are lubricated.

The annular space K is open on both sides in the axial direction and the first sealing device 15 is incorporated in the opening portion on the inner side, and the second sealing device 30 is incorporated in the opening portion on the outer side. Thus, foreign matter such as muddy water and dust is prevented from entering the annular space K.

Figure 2:
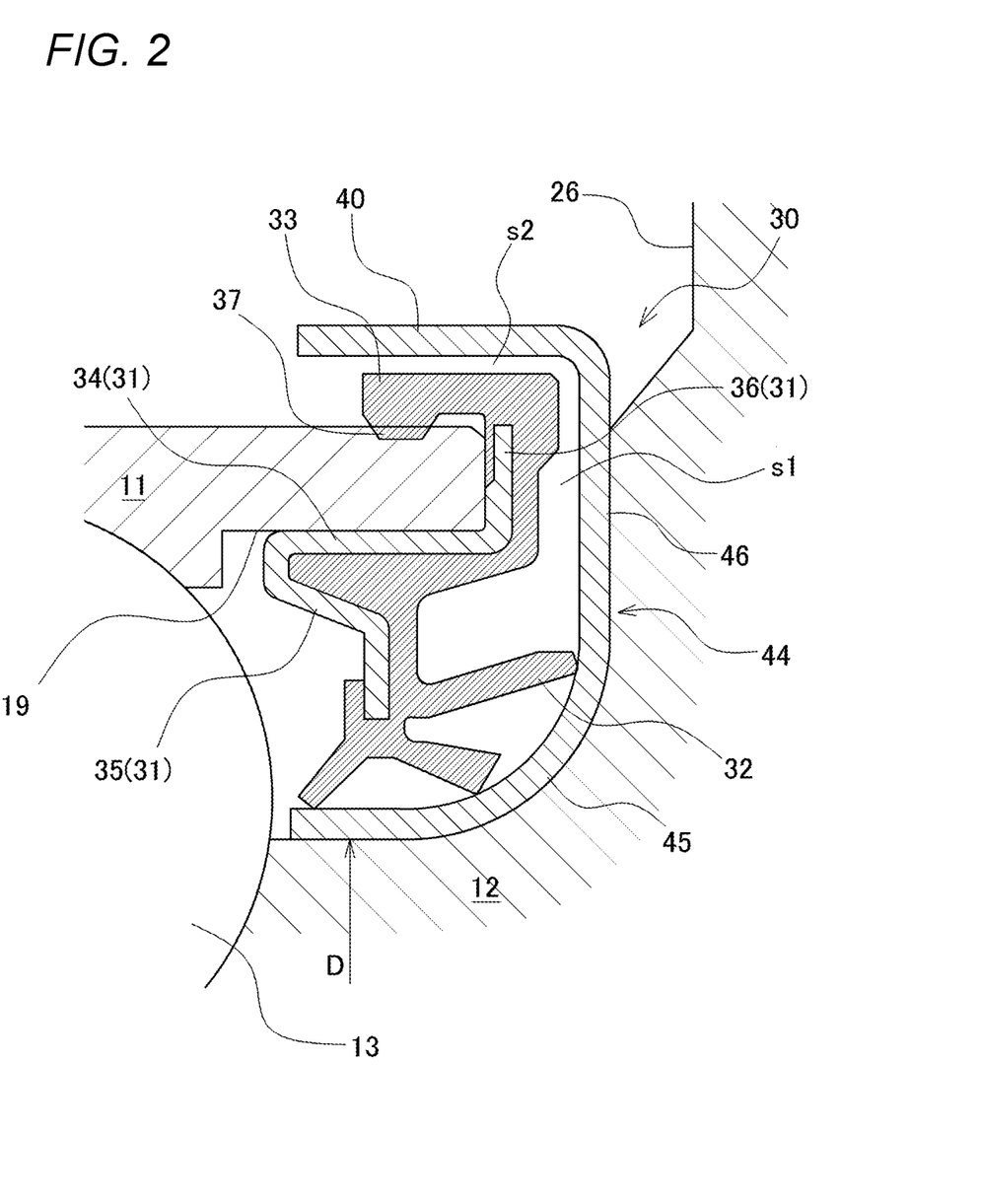
FIG. 2 is an enlarged view of a main part of a portion indicated by A in FIG. 1.

Next, the assembled state of the second sealing device 30 will be described. The first embodiment is characterized by the form of the second sealing device 30 and the slinger 40 installed radially outward. FIG. 2 is an enlarged view of a main part of a portion indicated by A in FIG. 1.

As illustrated in FIG. 2, the second sealing device 30 includes a core metal 31, a plurality of lips 32, and a cover portion 33.

The core metal 31 is formed by pressing a carbon steel plate or the like. Each lip 32 and the cover portion 33 are integrally formed by vulcanizing and molding an elastic body such as acrylic rubber in a die and are fixed to the core metal 31 by vulcanization adhesion.

The core metal 31 includes a base portion 34 of an annular shape, a lip holding portion 35 extending radially inward from one axial end thereof, and an annular portion 36 extending radially outward from the other axial end of the base portion 34. The second sealing device 30 is fixed to the outer ring 11 by press-fitting the outer periphery of the base portion 34 to the sealing device mounting surface 19. The annular portion 36 abuts on the end surface of the outer ring 11 in the axial direction.

Each lip 32 is supported by the lip holding portion 35 on the inner peripheral side of the base portion 34. Each lip 32 is in sliding contact with the annular member 44 assembled to the inner shaft 12, thereby preventing foreign matter from entering the annular space K.

The cover portion 33 has a cylindrical shape and extends in the axial direction from the outer periphery of the annular portion 36 along the outer periphery of the outer ring 11. A convex portion 37 is provided on the inner periphery of the cover portion 33 to protrude radially inward over the entire periphery. The inner diameter dimension of the convex portion 37 is smaller than the outer diameter dimension of the outer ring 11 and the cover portion 33 is in elastic contact with the outer peripheral surface of the outer ring 11.

The annular member 44 includes a seal sliding contact portion 45 where the lip 32 slides and the slinger 40 masking the second sealing device 30. The annular member 44 is manufactured by pressing a thin stainless steel plate and the seal sliding contact portion 45 and the slinger 40 are integrally formed.

The annular member 44 is incorporated along the outline shape of the inner shaft 12 and the axial cross section of the seal sliding contact portion 45 has an arc shape. An end portion on the inner peripheral side of the seal sliding contact portion 45 extends in the axial direction and has a cylindrical shape. An inner diameter dimension D is smaller than the outer diameter dimension of the inner shaft 12 and the annular member 44 is assembled on the outer periphery of the inner shaft 12 in an interference fit state. An end portion on the outer peripheral side of the seal sliding contact portion 45 extends outward in the radial direction and a flat plate portion 46 is formed in a direction orthogonal to the rotation axis m. The flat plate portion 46 abuts on the flange 26 in the axial direction. A clearance s1 in the axial direction is provided between the flat plate portion 46 and the second sealing device 30 and the outer ring 11 and the inner shaft 12 are not in contact with each other.

The slinger 40 is formed by bending the outer peripheral end of the flat plate portion 46 at right angles to the axial direction. The slinger 40 has a cylindrical shape and extends in the axial direction from the flange 26 toward the second sealing device 30. The inner diameter dimension of the slinger 40 is slightly larger than the outer diameter dimension of the cover portion 33. The slinger 40 faces the cover portion 33 with a clearance s2 in the radial direction.

In the first embodiment, the inner side end portion of the slinger 40 extends further to the inner side than the inner side end portion of the cover portion 33. Thereby, the slinger 40 is opposed to the overall length in the axial direction of the cover portion 33 in the radial direction via the clearance s2.

Figure 3:
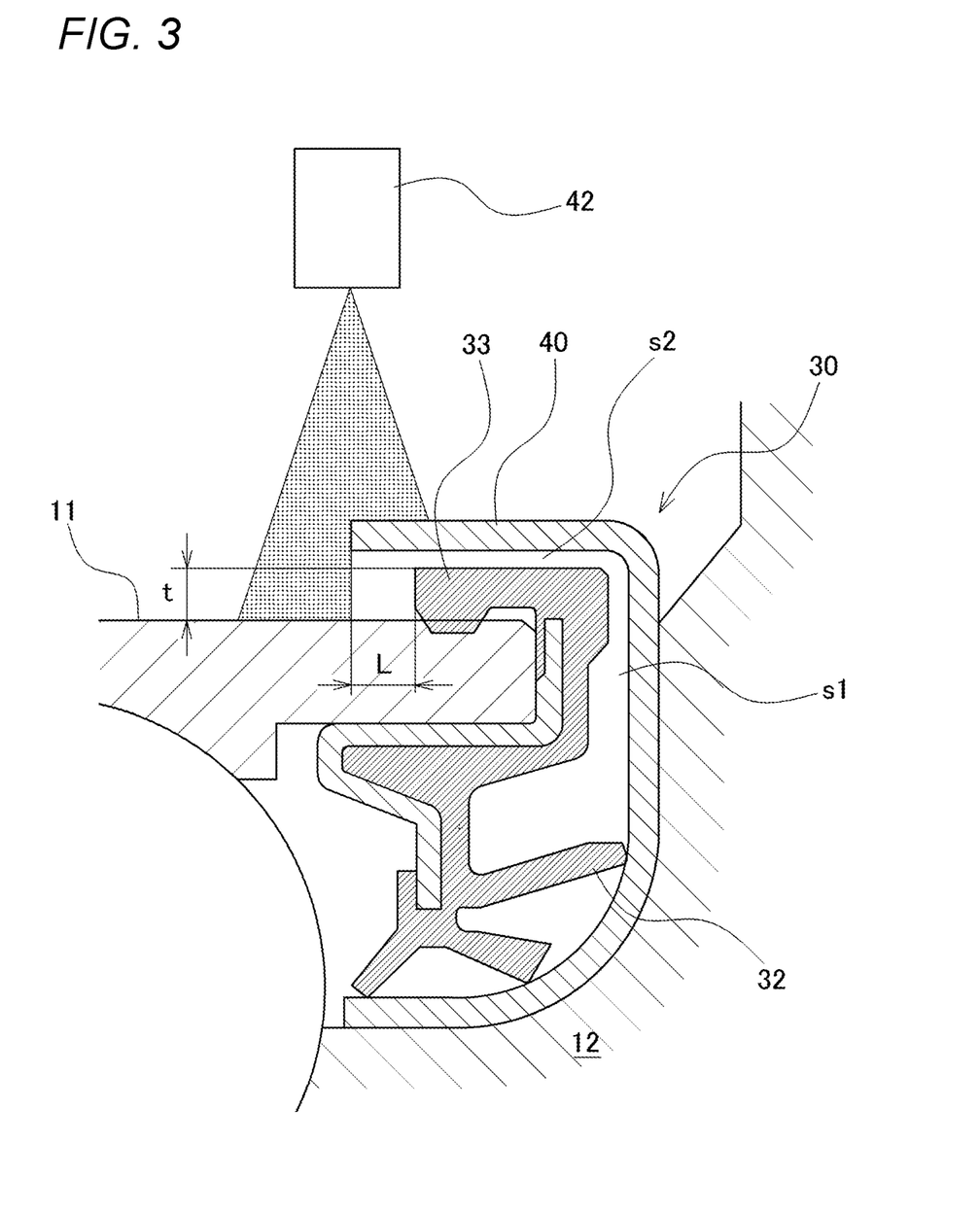
FIG. 3 is a schematic view illustrating a state in which coating is sprayed onto an outer peripheral surface of an outer ring.

Next, the operational effect of the slinger 40 in the bearing device 10 of the first embodiment will be described. The slinger 40 is particularly effective when a portion (a range indicated by a two-dot chain line E in FIG. 1) interposed in the axial direction between the flange 26 and the leg portion 16 (fixed portion of the outer ring 11) of the outer ring 11 is coated Coating is performed by spraying coating with compressed air. FIG. 3 is a schematic view illustrating a state in which coating is sprayed onto the outer peripheral surface of the outer ring 11 by a coating device 42. The coating is sprayed in a direction substantially perpendicular to the outer peripheral surface of the outer ring 11. Here, a case where the outer peripheral surface of the outer ring 11 is coated is described as an example. However, the same applies to a case where the other outer peripheral surface of the bearing device 10 is coated.

As illustrated in FIG. 3, in the first embodiment, the slinger 40 fixed to the inner shaft 12 extends in the axial direction outside the second sealing device 30 in the radial direction. Therefore, the axial clearance s1 between the second sealing device 30 and the flange 26 is covered by the slinger 40 when viewed from the outside in the radial direction, so the coating sprayed toward the outer peripheral surface of the outer ring 11 does not enter the clearance s1.

When it is assumed that the slinger 40 is not provided, the coating sprayed toward the outer peripheral surface of the outer ring 11 easily enters the clearance s1. For this reason, the coating adheres to the lip 32 and then solidifies. In such a state where the solidified coating is adhered, the elasticity of the lip 32 is lowered, so the sealing property is reduced. There is a possibility that the rubber material forming the lip 32 may deteriorate due to contact with the coating. Since the clearance s1 is extremely small, the coating may stay in the clearance s1 and then solidify. In this case, there is a possibility that smooth rotation of the inner shaft 12 may be hindered by the inner shaft 12 and the outer ring 11 being fixed or the running torque of the inner shaft 12 becoming heavy.

On the other hand, in the first embodiment, since the coating does not enter from the clearance s1, the sealing property of the lip 32 can be favorably maintained. Since the coating does not stay between the outer ring 11 and the flange 26, smooth rotation of the inner shaft 12 can be maintained.

In the first embodiment, the cover portion 33 is covered by the slinger 40 over the entire axial direction, so that it is possible to prevent the coating from being directly sprayed onto the cover portion 33. Since the coating does not adhere to the cover portion 33, the elasticity of the cover portion 33 can be maintained and the rubber material forming the cover portion 33 is not deteriorated.

The inner side end portion of the slinger 40 extends further to the inner side than the inner side end portion of the cover portion 33. Thereby, even when the spraying direction of the coating is inclined, it is possible to prevent the coating from being sprayed to the cover portion 33.

Thus, since the coating is not sprayed on the cover portion 33, the coating does not stay in the clearance s2 in the radial direction between the slinger 40 and the cover portion 33. Therefore, since the inner shaft 12 and the outer ring 11 can be prevented from sticking to each other, smooth rotation of the inner shaft 12 can be maintained in the first embodiment.

A protrusion amount L that the inner side end portion of the slinger 40 protrudes further to the inner side than the inner side end portion of the cover portion 33 should be approximately equal to a plate thickness tin the radial direction of the cover portion 33. When the protrusion amount L is small, if the spraying direction of the coating is inclined, the coating is sprayed on the end surface of the cover portion 33. Therefore, the coating stays between the slinger 40 and the cover portion 33 and there is a risk of abnormality in the running torque of the inner shaft 12. On the other hand, when the protrusion amount L is extremely large, the weight of the bearing device 10 increases and the manufacturing cost increases, which is not preferable.

As described above, in the bearing device 10 of the first embodiment, it is not necessary to remove or attach the slinger 40 every time it is coated, so that it is possible to directly coat the bearing device 10 that has been assembled. In this way, since an operation such as masking can be eliminated when coating the outer peripheral surface, an increase in the manufacturing cost of the bearing device for a wheel can be prevented.

The bearing device manufactured in this way has the sealing portion provided with the cover portion 33 and the entire outer peripheral surface is coated, so durability is extremely high even when used in severe wet conditions.

Second Embodiment

Figure 4:
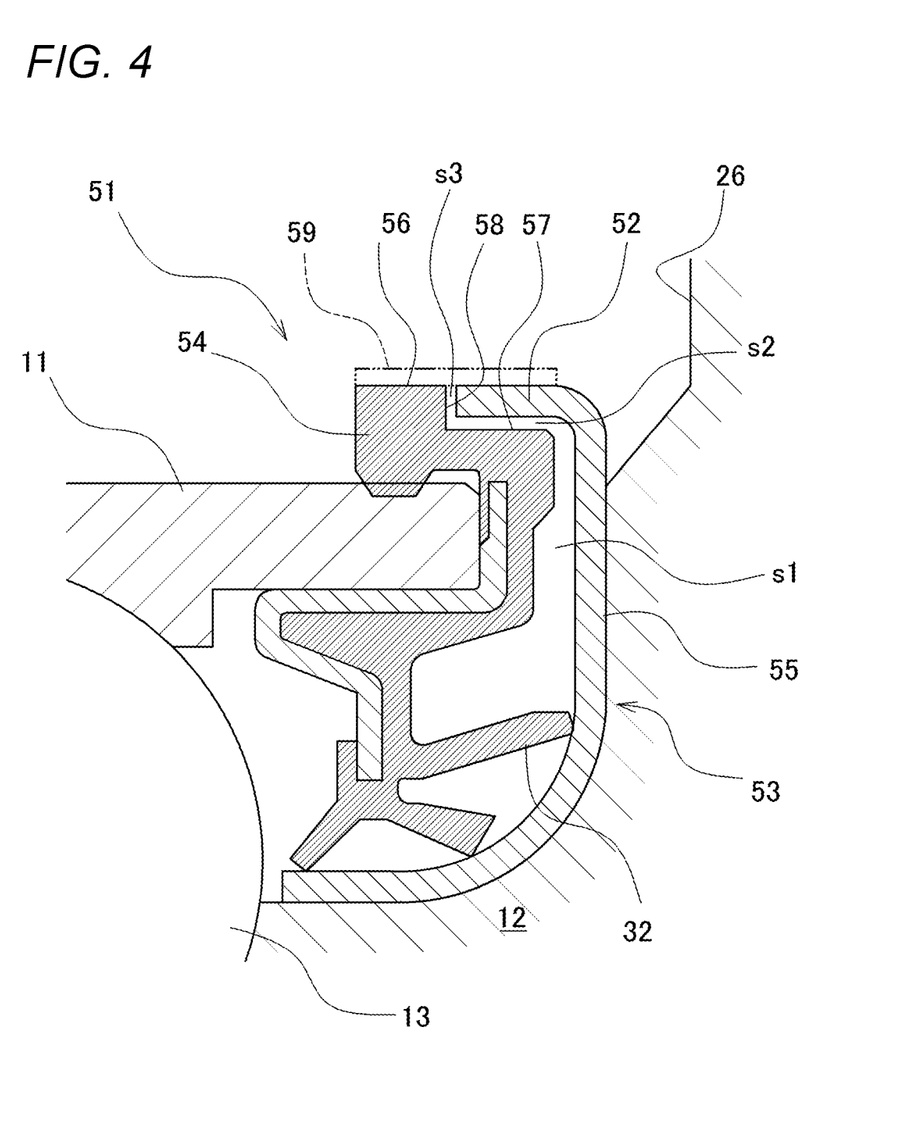
FIG. 4 is an enlarged view of a main part similar to FIG. 2 in a bearing device for a wheel according to a second embodiment.

Another embodiment (hereinafter, "second embodiment") of the invention will be described. In a bearing device for a wheel 50 (hereinafter simply referred to as "bearing device 50") according to a second embodiment, the form of the cover portion 54 of the second sealing device 51 and the form of the slinger 52 are different as compared with the bearing device 10 of the first embodiment. Description of the common configuration is omitted.

FIG. 4 is an enlarged view of a main part similar to FIG. 2 in the bearing device 50 according to the second embodiment. In the second embodiment, as in the first embodiment, the slinger 52 forms a part of the annular member 53 formed by pressing a thin stainless steel plate. The slinger 52 is formed in a cylindrical shape by bending the outer peripheral end of the flat plate portion 55 of the annular member 53 at a right angle in the axial direction.

The outer periphery of the cover portion 54 in the second embodiment is formed of two cylindrical surfaces having different diameter dimensions and a cylindrical surface 56 having a large diameter and a cylindrical surface 57 having a small diameter are connected by a side surface 58 in a direction orthogonal to the rotation axis m. The cylindrical surface 57 having a small diameter is formed further on the outer side than the cylindrical surface 56 having a large diameter.

The slinger 52 extends in the axial direction from the flange 26 toward the second sealing device 51 on the radially outer side of the cylindrical surface 57 having a small diameter. The outer diameter dimension of the cylindrical surface 57 having a small diameter is slightly smaller than the inner diameter dimension of the slinger 52. The outer diameter dimension of the cylindrical surface 56 having a large diameter is substantially the same as the outer diameter dimension of the slinger 52 and the outer peripheral surface of the slinger 52 forms one cylindrical surface together with the cylindrical surface 56 having a large diameter. Thus, the slinger 52 is fixed to the inner shaft 12 and is opposed to a part in the axial direction of the cover portion 54 in the radial direction via the clearance s2.

The inner side end portion of the slinger 52 has a slight clearance s3 in the axial direction with respect to the side surface 58, and thus the slinger 52 and the cover portion 54 are not in contact with each other. Thereby, the inner shaft 12 can rotate smoothly.

Next, the operational effect of the slinger 52 in the bearing device 50 will be described.

In the bearing device 50, when coating the outer peripheral surface of the outer ring 11, a masking member 59 such as a tape is pasted across the cylindrical surface 56 of a large diameter and the outer peripheral surface of the slinger 52. In FIG. 4, a state where the masking member 59 is attached is indicated by a two-dot chain line.

In the bearing device 50, the outer diameter dimension of the cylindrical surface 56 having a large diameter and the outer diameter dimension of the slinger 52 are substantially the same. Therefore, when the masking member 59 such as a tape is pasted, it can be easily pasted in the same manner as when pasting it on a simple cylindrical surface. In this way, the axial clearance s3 between the cylindrical surface 56 having a large diameter and the slinger 52 can be reliably sealed on the outer peripheral side.

Thus, in the bearing device 50, the axial clearance s1 between the second sealing device 51 and the flange 26 is covered by the slinger 52 when viewed from the outside in the radial direction. Therefore, the coating sprayed toward the outer peripheral surface of the outer ring 11 does not enter the clearance s1. Thus, the sealing property of the lip 32 can be maintained favorably after coating.

By sticking the masking member 59, the axial clearance s3 between the cylindrical surface 56 having the large diameter and the slinger 52 is securely sealed. Therefore, since the coating does not stay in the clearance s3, the cover portion 54 and the slinger 52 are not fixed by the solidified coating.

Thus, since the clearances s2 and s3 are maintained in the radial direction and the axial direction between the slinger 52 and the cover portion 54 after coating, smooth rotation of the inner shaft 12 can be maintained. When the coating operation is completed, the masking member 59 is removed. When the masking member 59 is removed, the slinger 52 is exposed to the external space. The slinger 52 is made of a stainless steel plate and does not rust.

Since the entire surface of the cylindrical surface 56 of the large diameter is covered with the masking member 59, it is possible to prevent the coating from adhering to the cover portion 54. Thereby, while maintaining the elasticity of the cover portion 54, the deterioration of the rubber material forming the cover portion 54 can be prevented.

As described above, in the bearing device 50 of the second embodiment, the masking member 59 for preventing the coating from splashing on the lip 32 of the sealing device can be attached and removed extremely easily. Therefore, it can coat directly by masking the bearing device 50 which completed the assembly by a simple method. Therefore, when coating the outer peripheral surface, operations such as masking can be simplified, and thus an increase in the manufacturing cost of the bearing device for a wheel can be prevented.

Third Embodiment

Figure 5:
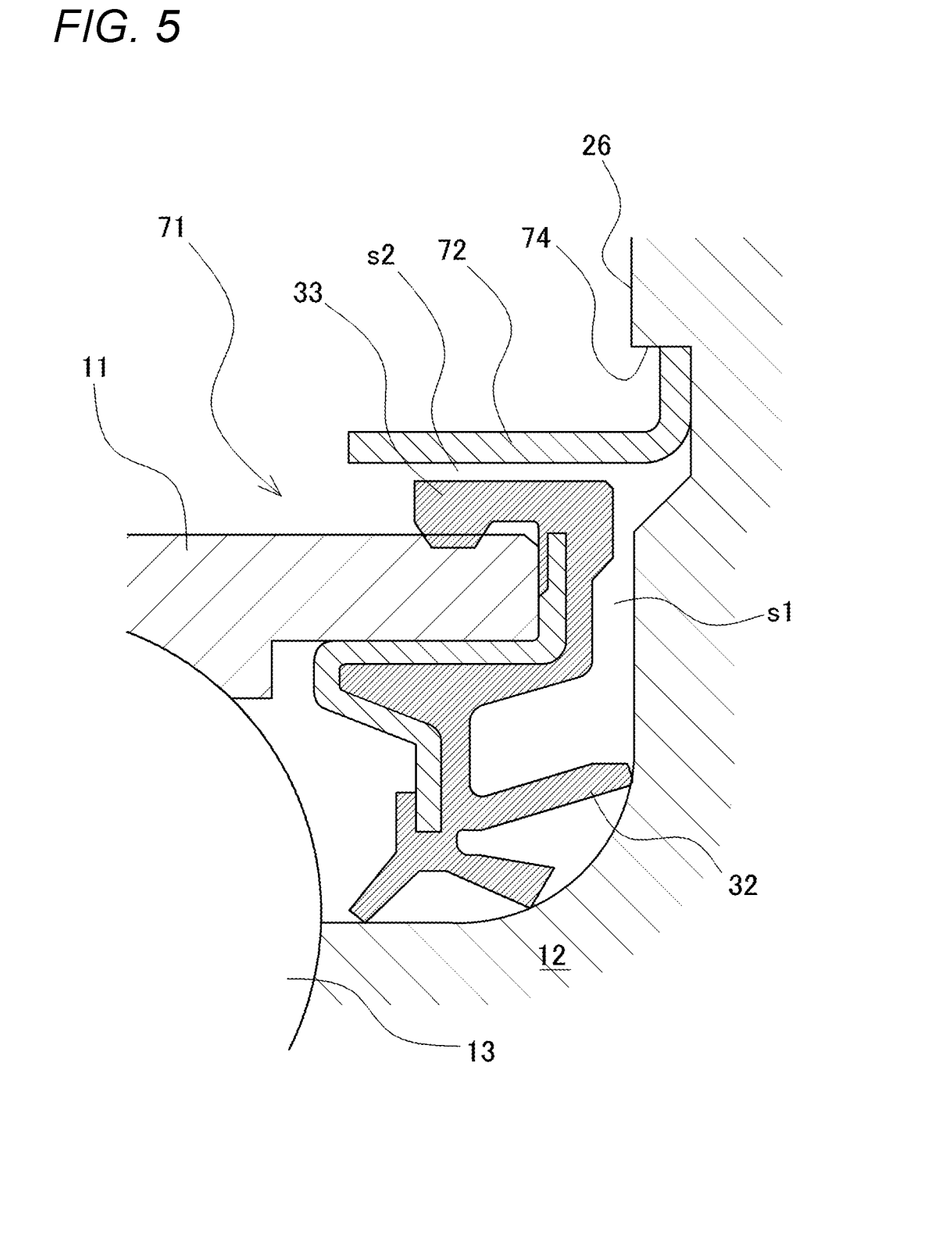
FIG. 5 is an enlarged view of a main part similar to FIG. 2 in a bearing device for a wheel according to a third embodiment.

Another embodiment (hereinafter, "third embodiment") of the invention will be described. In a bearing device for a wheel 70 (hereinafter simply "bearing device 70") of a third embodiment, the form of the slinger 72 is different as compared with the bearing device 10 of the first embodiment. Description of the common configuration is omitted.

FIG. 5 is an enlarged view of a main part similar to FIG. 2 in the bearing device 70.

In the bearing device 70, the axial cross-section shape of the slinger 72 is formed into an L shape by pressing a thin stainless steel plate. A recess portion 74 of an annular shape which is coaxial with the rotation axis m is formed on the inner side lateral surface of the flange 26. The slinger 72 is fixed to the flange 26 by swaging or the like after being fitted into the recess portion 74.

The slinger 72 has a cylindrical shape and extends in the axial direction from the flange 26 toward the second sealing device 71. The inner diameter dimension of the slinger 72 is slightly larger than the outer diameter dimension of the cover portion 33. In the bearing device 70, the inner side end portion of the slinger 72 extends further to the inner side than the inner side end portion of the cover portion 33. Thus, the slinger 72 is opposed to the entire axial length of the cover portion 33 in the radial direction via the clearance s2.

The operational effect of the slinger 72 in the bearing device 70 is the same as that of the slinger 40 of the first embodiment. That is, when the bearing device 70 is coated, the coating is prevented from adhering to the lip 32 and the cover portion 33. Therefore, the favorable sealing property is maintained and the deterioration of the rubber member is prevented. The coating is prevented from staying at the clearances s1 and s2, and thus the inner shaft 12 can rotate smoothly. Detailed description is omitted.

In the bearing device 70, as in the bearing device 10 of the first embodiment, it is not necessary to remove the slinger 72 every time it is coated, so that it is possible to directly coat the bearing device 70 that has been assembled. In this way, since an operation such as masking can be eliminated when coating the outer peripheral surface, an increase in the manufacturing cost of the bearing device for a wheel can be prevented.

As can be understood from the above description, according to the aspect of the invention, when coating the outer peripheral surface of the bearing device, particularly the outer peripheral surface of the region interposed in the axial direction between the fixed portion and the flange, an operation such as masking is not necessary or masking can be performed in an extremely simple manner. Therefore, an increase in the manufacturing cost of the bearing device for a wheel can be prevented. The invention is not limited to the embodiments described above and various other modifications are possible.

This application is based on a Japanese patent application (Japanese Patent Application No. 2017-126025) filed on Jun. 28, 2017, the contents of which are incorporated herein by reference.

DESCRIPTION OF REFERENCE SIGNS (First Embodiment)
10: bearing device for wheel
11: outer ring
12: inner shaft
13: ball
14: retainer
15: first sealing device
16: leg portion
17: outer raceway surface
26: flange
27: inner raceway surface
30: second sealing device
31: core metal
32: lip
33: cover portion
40: slinger
44: annular member
(Second Embodiment)
50: bearing device for wheel
51: second sealing device
52: slinger
53: annular member
54: cover portion
56: cylindrical surface of large diameter
57: cylindrical surface of small diameter
58: side surface,
59: masking member
(Third Embodiment)
70: bearing device for wheel
71: second sealing device
72: slinger
74: recess portion
(Related Art)
80: sealing device
81: outer ring
82: inner shaft
83: lip
84: cover portion
85: flange
90: knuckle

The invention claimed is:
1. A bearing device for a wheel, comprising:
an outer ring comprising:
an outer raceway surface formed on an inner periphery; and
a leg portion protruding radially on an outer periphery and fixed to a vehicle body;
an inner shaft comprising:
an inner raceway surface formed on an outer periphery; and
a flange provided on a shaft end to which a wheel is attached;
a plurality of rolling elements rotatably provided between the outer raceway surface and the inner raceway surface;
a sealing device which seals an opening portion on a flange side of an annular space formed between the outer ring and the inner shaft; and
a slinger fixed to the inner shaft and extending axially at a radial outer side of the sealing device,
wherein the sealing device comprises: an elastic lip fixed to the outer ring and in sliding contact with the inner shaft; and a cylindrical cover portion in elastic contact with an outer peripheral surface of the outer ring,
wherein the slinger is opposed to at least a part of an outer periphery of the cover portion in a radial direction via a clearance,
wherein the slinger is opposed to an overall length in an axial direction of the cover portion in the radial direction via the clearance,
wherein at least a part of an outer peripheral surface of the outer ring and a part of an outer peripheral surface of an inner side end portion of the slinger are coated, and
wherein an amount that an inner side end portion of the slinger protrudes further than an inner side portion of the cylindrical cover portion is approximately equal to a plate thickness in a radial direction of the cylindrical cover portion.

2. A bearing device for a wheel, comprising:
an outer ring comprising:
an outer raceway surface formed on an inner periphery; and
a leg portion protruding radially on an outer periphery and fixed to a vehicle body;
an inner shaft comprising:
an inner raceway surface formed on an outer periphery; and
a flange provided on a shaft end to which a wheel is attached;
a plurality of rolling elements rotatably provided between the outer raceway surface and the inner raceway surface;
a sealing device which seals an opening portion on a flange side of an annular space formed between the outer ring and the inner shaft; and
a slinger fixed to the inner shaft and extending axially at a radial outer side of the sealing device,
wherein the sealing device comprises: an elastic lip fixed to the outer ring and in sliding contact with the inner shaft; and a cylindrical cover portion in elastic contact with an outer peripheral surface of the outer ring, and
wherein the slinger is opposed to at least a part of an outer periphery of the cover portion in a radial direction via a clearance, and
wherein the slinger is radially opposed to a part of an outer periphery of the cover portion via the clearance, and an outer diameter dimension of the other part of the outer periphery of the cover portion which is a part not opposed to the slinger in the radial direction is substantially equal to an outer diameter dimension of the slinger.

3. The bearing device for a wheel according to claim 1, wherein at least part of the outer peripheral surface of the outer ring in a portion between the leg portion of the outer ring and the flange of the inner shaft is coated.

\* \* \* \* \*